US009472015B2

(12) United States Patent
Sikka et al.

(10) Patent No.: US 9,472,015 B2
(45) Date of Patent: Oct. 18, 2016

(54) REAL-TIME VISUALIZATION OF TRANSACTIONAL DATA OBJECTS

(71) Applicants: Vishal Sikka, Los Altos, CA (US); Samuel J. Yen, Los Altos, CA (US); Sanjay Rajagopalan, Palo Alto, CA (US); Jeong H. Kim, San Jose, CA (US)

(72) Inventors: Vishal Sikka, Los Altos, CA (US); Samuel J. Yen, Los Altos, CA (US); Sanjay Rajagopalan, Palo Alto, CA (US); Jeong H. Kim, San Jose, CA (US)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 13/692,814

(22) Filed: Dec. 3, 2012

(65) Prior Publication Data

US 2013/0307843 A1 Nov. 21, 2013

Related U.S. Application Data

(60) Provisional application No. 61/688,511, filed on May 15, 2012.

(51) Int. Cl.
| | | |
|---|---|---|
| *G06T 15/00* | (2011.01) | |
| *G06T 19/00* | (2011.01) | |
| *G06F 17/30* | (2006.01) | |

(52) U.S. Cl.
CPC ......... *G06T 15/00* (2013.01); *G06F 17/30572* (2013.01); *G06T 19/003* (2013.01)

(58) Field of Classification Search
CPC .................................. G06F 17/3005–17/30064
See application file for complete search history.

(56) References Cited

U.S. PATENT DOCUMENTS

| | | | | |
|---|---|---|---|---|
| 5,717,877 | A  * | 2/1998 | Orton .................... | G06F 3/0481 715/835 |
| 2002/0087679 | A1* | 7/2002 | Pulley ................... | G06Q 30/02 709/224 |
| 2008/0270363 | A1* | 10/2008 | Hunt ................. | G06F 17/30489 |
| 2008/0288306 | A1* | 11/2008 | MacIntyre ........ | G06F 17/30536 705/7.29 |
| 2009/0113310 | A1* | 4/2009 | Appleyard ............. | G06Q 10/00 715/742 |
| 2010/0333045 | A1* | 12/2010 | Gueziec et al. ............. | 715/863 |
| 2011/0141118 | A1* | 6/2011 | Cardno .................. | G07F 17/32 345/441 |
| 2011/0161137 | A1* | 6/2011 | Ubalde et al. ............... | 705/7.34 |
| 2011/0252327 | A1* | 10/2011 | Awasthi et al. ............... | 715/736 |
| 2013/0238548 | A1* | 9/2013 | George ............ | G06F 17/30442 707/600 |

OTHER PUBLICATIONS

Oberheide, Jon, Michael Goff, and Manish Karir. "Flamingo: Visualizing internet traffic." Network Operations and Management Symposium, 2006. NOMS 2006. 10th IEEE/IFIP. IEEE, 2006.*
Krasser, Sven, et al. "Real-time and forensic network data analysis using animated and coordinated visualization." Information Assurance Workshop, 2005. IAW'05. Proceedings from the Sixth Annual IEEE SMC. IEEE, 2005.*

* cited by examiner

*Primary Examiner* — Daniel Hajnik
(74) *Attorney, Agent, or Firm* — Schwegman Lundberg & Woessner, P.A.

(57) ABSTRACT

A business management system for visualizing transactional data objects in real time is provided. An example system accesses a stream of transactional data objects and generates a in a three-dimensional graphical paradigm. A viewer may manipulate the presentation of the transactional data objects by engaging gestures and visual controls that may be provided on a display screen.

22 Claims, 17 Drawing Sheets

REAL-TIME VISUALIZATION OF TRANSACTIONAL DATA OBJECTS

CROSS-REFERENCE TO RELATED APPLICATIONS

This application claims, the benefit of U.S. Provisional Application No. 61/688,511, filed May 15, 2012, entitled "REAL-TIME VISUALIZATION OF TRANSACTIONAL DATA OBJECTS," which is incorporated herein by reference in its entirety.

TECHNICAL FIELD

This application relates to a method and system to provide visualization of transactional data objects in real time.

BACKGROUND

Data visualization has always presented technological challenges, and it continues to provide outlets for creativity, especially with the explosion of the amount of information now available. Some contemporary database applications allow for collecting and processing vast quantities of data, including transactional data associated with real-time events. For example, with the advent of Smart Grid technology and Advanced Metering Infrastructure (AMI), electric companies may collect actual AMI data, from millions of customers multiplied by energy consumption readings occurring in fifteen minute intervals. Other examples of applications generating a large volume of transactional data objects continuously in real time are online social networking services, such as Facebook, and micro-blogging services, such as Twitter. It is important for businesses to be able to quickly analyse this real-time data in order to make strategic decisions for the benefit of their company.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
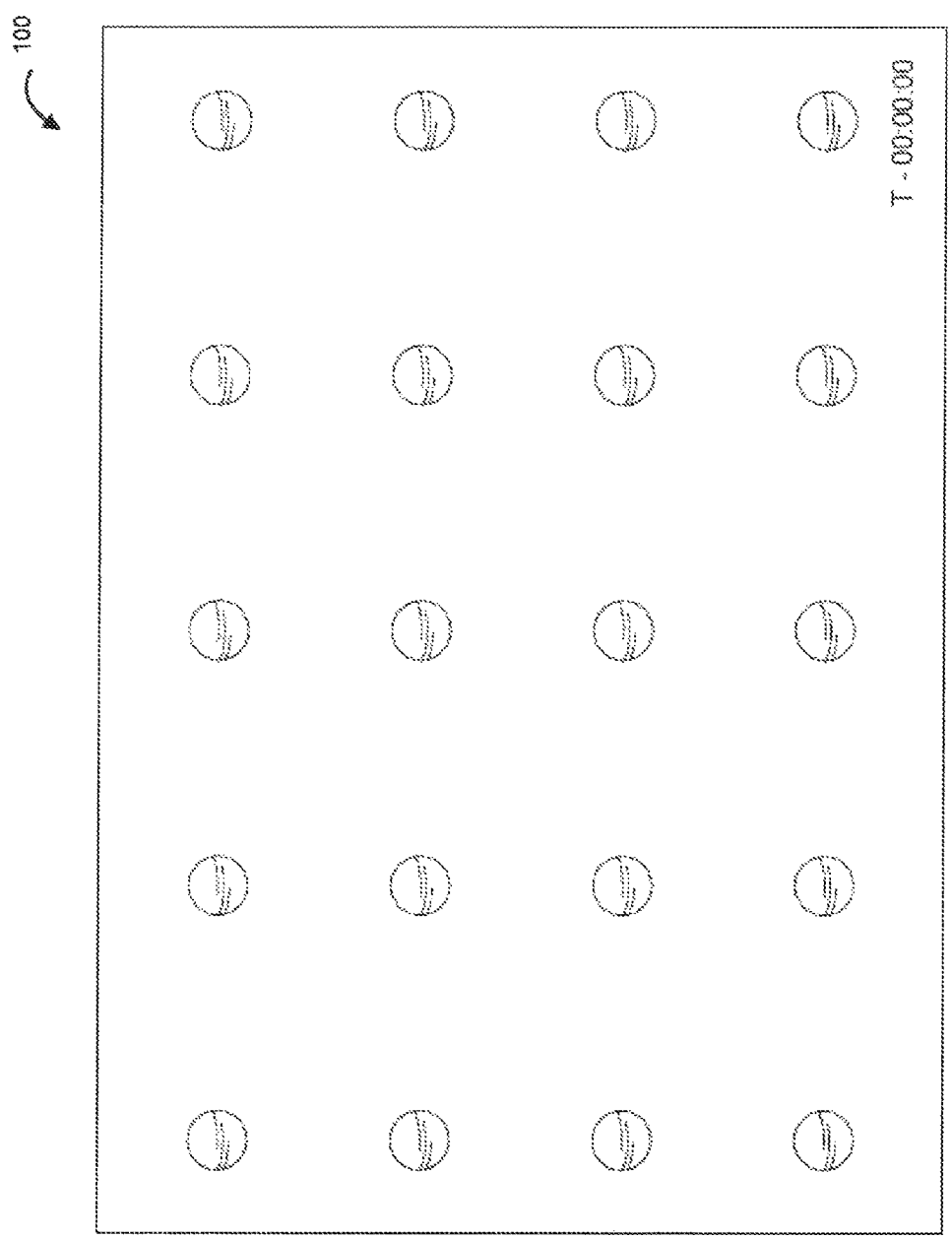
FIG. 1-6 are example screens of a user interface (UI) configured to provide visualization of transactional data objects in real time, in accordance with, one example embodiment.

As described herein, a business management tool is described that provides visualization of transactional data objects in real time. In the following description, for purposes of explanation, numerous specific details are set forth in order to provide a thorough understanding of an embodiment of the present invention. It will be evident, however, to one skilled in the art that the present invention may be practiced without these specific details.

As mentioned above, particular contemporary database applications may allow for collecting and processing vast quantities of data, including transactional data associated with, real-time events. For example, a database that resides in-memory (using volatile memory as opposed to residing on disk storage media) and provides, simultaneously, transactional and analytical capabilities makes it possible to collect, store, and process individual events such as users' actions (e.g., clicks, gestures, etc.) in an on-line web store, users' actions in an on-line multi-player game, credit card swipes at points-of sale locations, etc, on a scale that was not previously possible. An example of such a solution is HANA® by SAP of Walldorf, Germany.

HANA® allows for reading around unwanted data by organizing tables in a columnar manner. In addition to the common row-oriented storage schema, a column-oriented data storage layout can be used. This means that an application does not have to wait for the database to fetch data that it does not need, as all the data in a table column is stored in an adjacent manner. HANA® caches all data in memory, and hard disks are only needed to record changes to the database for permanent persistency. HANA® keeps the number of changes to a dataset small by recording every change as delta with respect, to the original dataset. Data is not modified in place, but inserted or appended to a table column. As all of the old data is retained, applications can effectively "time-travel" through data providing views of the data as it has changed over time. Furthermore, unlike some of the existing database applications that separate data management and applications in two distinct architectural layers (the database layer and the application layer), HANA® avoids this common bottleneck by locating data-intensive application logic to where the location of the data, which is in the database itself. To enable this embedding of application logic into the database, an extension to the standard SQL (Structured Query Language) may be provided. Such an extension allows programming of data-intensive operations in a way such that they can be executed in the database layer and also allows extending SQL queries to contain high level calculations thereby extending the data processing capabilities of the database.

However, the analysis of data patterns based on this real-time event data represents a major technical challenge due to the sheer scale of the problem. Embodiments of the present invention include approaches that enhance a user's experience by rendering a visualization of events that occur at a high rate in real time. Each event in the visualization is represented by a transactional data object. A transactional data object, for the purposes of this description, is an object that is logged into a database and is characterized by a certain degree of reliability. A transactional data object refers to the digital information representing an event of any sort, which would typically be created and stored in a database for the purposes of recording, reviewing or analyzing the event at a future time.

In an embodiment, visualization of transactional data objects in real time may be described using "art event rain"

or "a star field" metaphor. Each transactional data object may be visualized as a drop of rain falling to the ground or as a star within a navigable vast universe of real-time events. For example, in an "event rain" visualization, each "falling drop" that is viewed represents one or more transactional data object occurring in real-time. Drops can occur more frequently indicating more frequent event activity and can occur in various areas of the display that may indicate a particular attribute of the event. In another example, the "star field" may appear as though one is traveling within a vast universe of stars. Each star representing a particular event, and the placement of stars within the universe indicating an attribute of the event. A bunch of stars together appearing as a galaxy may indicate a vast quantity of similar type events. In one embodiment, the depth spacing between the rain drops or the stars is directly proportional to the actual amount of time elapsed between the events. A user may be able to navigate through the historical events in real time or at a controlled speed, but the distance between the stars may remain proportionally unchanged, based on the time at which the respective events occurred.

The visualization approach proposed herein provides an administrative user or an analyst with a unique opportunity to navigate through these real-time events, as well as view these events through any of a number filters associated with various attributes of the transactional data objects. The visualization may utilize different physical attributes such as various colors, shapes, highlights, or size to represent various attributes of the transactional data objects. For example, the rain drops may each have a color indicating a particular type event (e.g., a yellow drop indicating an end-user has clicked to view a product and a red drop indicating that an end-user has purchased a product), in another example, in the star field, different types of shapes may indicate different attributes. A simple point of light might indicate something that occurs often such as an end-user viewing a particular web page, and a planet may indicate that the end-user has clicked on a particular product and placed this in a wish list. In addition, the geographic location of the star or raindrop on the display screen may also indicate attributes of the transactional data objects. Furthermore, a gesture-based navigation may allow an administrative user or analyst to zoom in and out of the three-dimensional space of transactional data objects, move around that space, and select filters to enhance or help navigate to find particular desired transactional data objects.

In one example of an embodiment, applying a filter to the universe of the transactional data objects results in visualizing patterns where some of the stars representing the transactional data objects come into the foreground, while others fade away. For example, a filter might be applied to transactional data objects associated with an end-users' clicks in an on-line web store. This may reveal that particular end-users within a certain demographic (e.g., end-users within a certain age range) are not purchasing, a certain type of product or service. A business may then make a real-time decision to offer a discount on a particular product or service or change the range of products or services offered to attract that particular demographic of end-user.

In another example, streams of transactional data objects may be visualized as a so-called heat map. As used herein, a heat map is a graphical representation of data where particular attributes with a transactional data object are represented by a color. For example, where each of the transactional data objects include an attribute associated with a geographical location and an attribute associated with a dollar value, a heat map may be generated illustrating the correlation between the geographic location of a user and the dollar amount generated by the respective users. For example, end-users within a particular urban center may spend a larger amount on a product or service than end-users residing in outlying areas. The heat map may display end-users who spend more with a red color, and those who spend less with a blue color. Under this circumstance, red colors would appear in a much larger concentration in the urban center and blue would appear more in the outlying areas. Then a business may elect to make a business decision, such as providing higher priced goods in an urban center, based on the buying patterns exhibited by the visualization. Example screens of an administrative user or analyst interface (UI) configured to provide visualization of transactional data objects are shown in FIG. 1-6.

Figure 2:
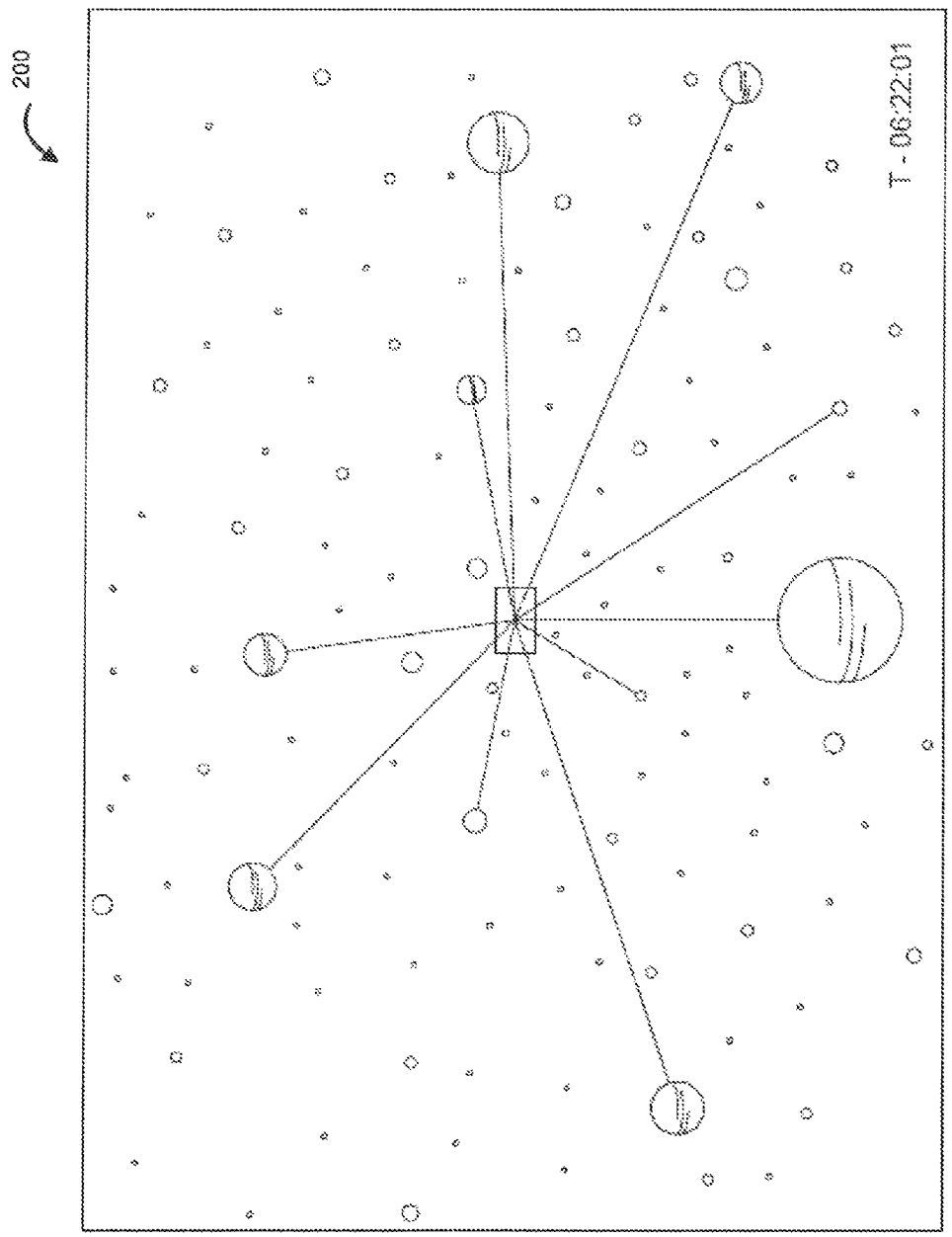

In FIG. 1, the UI screen 100 shows a visualization of transactional data objects is the form of a universe where a transactional data object is represented by a shape that resembles a star. The time code reads zero. As the time moves forward, e.g., every second or a fraction of a second, many new stars representing transactional data appear—filling the space before the viewer. An example UI screen 200 of FIG. 2 is a representation of transactional data objects at a certain point in time In one embodiment, the viewer may use gestures or other control commands to shift the view that is being presented on a display device to reflect the visualized transactional objects at a different point in time. Thus, what is being presented to a viewer, as shown in FIGS. 1 and 2, may be described as a universe of events or a star field. Each star in this universe represents a discrete event, such as, e.g., a business transaction that has occurred in the past. An example representation of a star field may include a vast array of brilliant, shining dots. The stars may be made to look like they are somehow "alive," pulsating with energy. The stars may also be presented as being of different types and colors. These events shown by stars may represent activities, such as activities in a commercial retail environment, including point of sale (POS) events, it will be noted, that the stars could represent any type of event—transactions in a business system, events generated by a sensor network, movement of vehicles in a logistical map etc.

Figure 3:
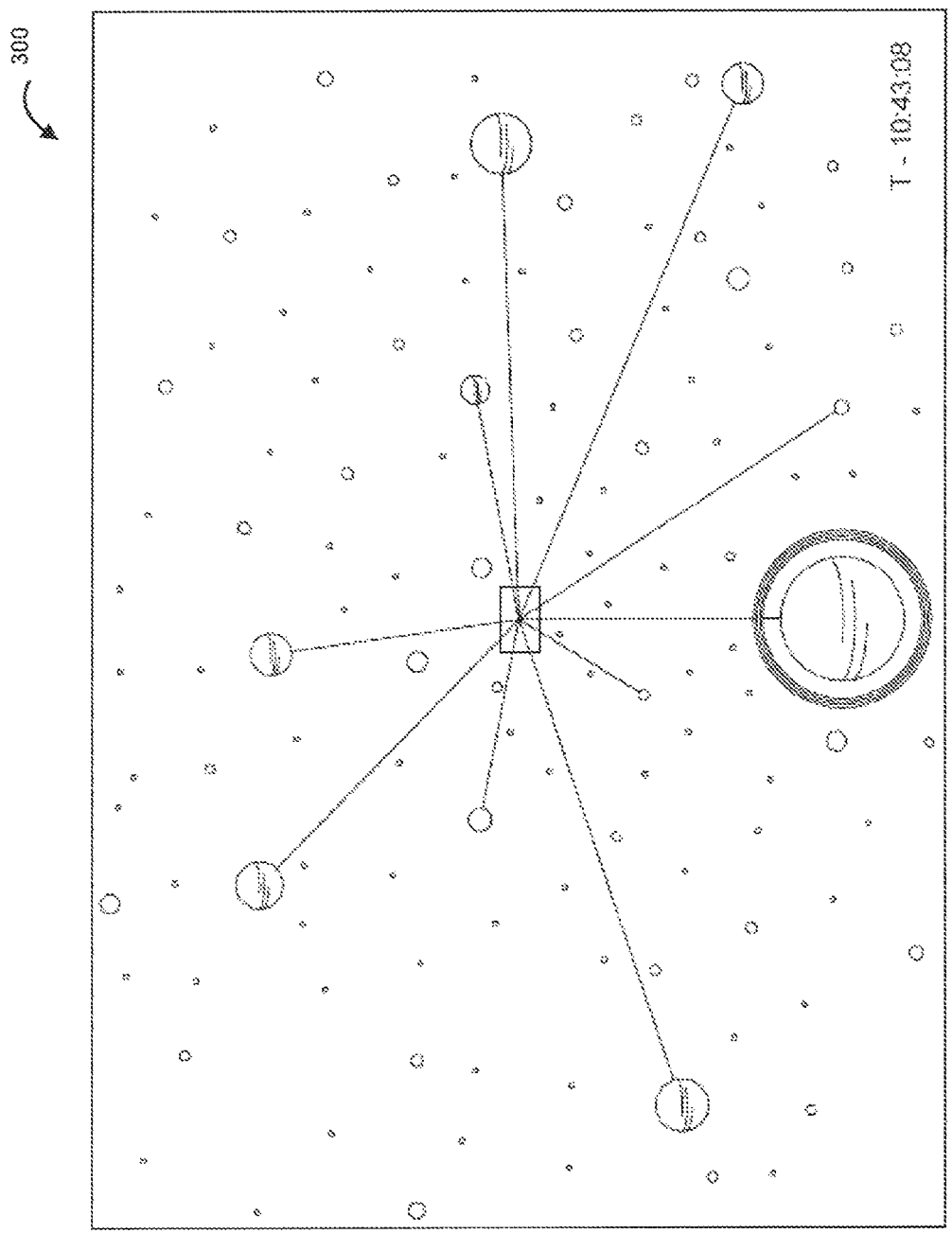
Figure 4:
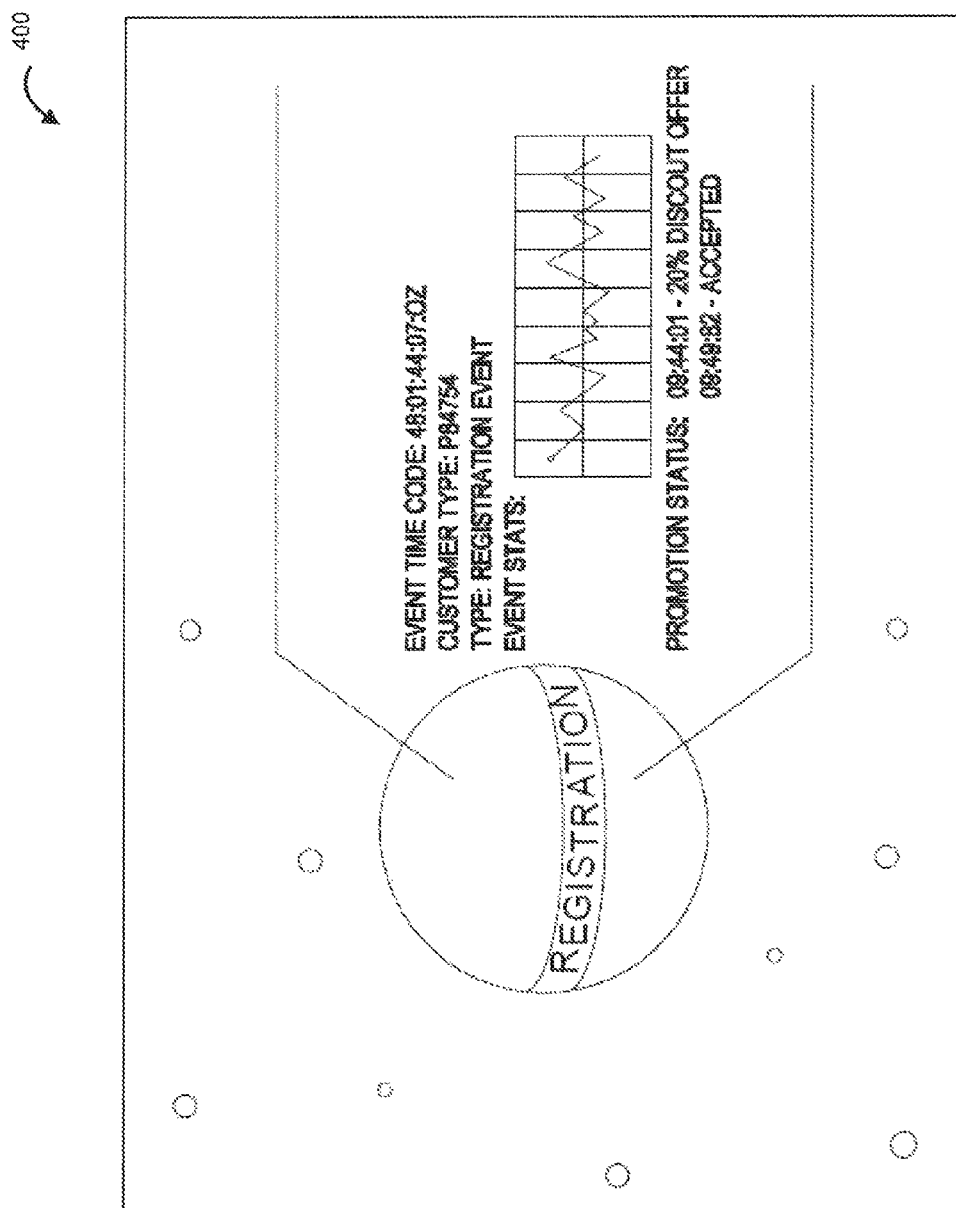
Figure 5:
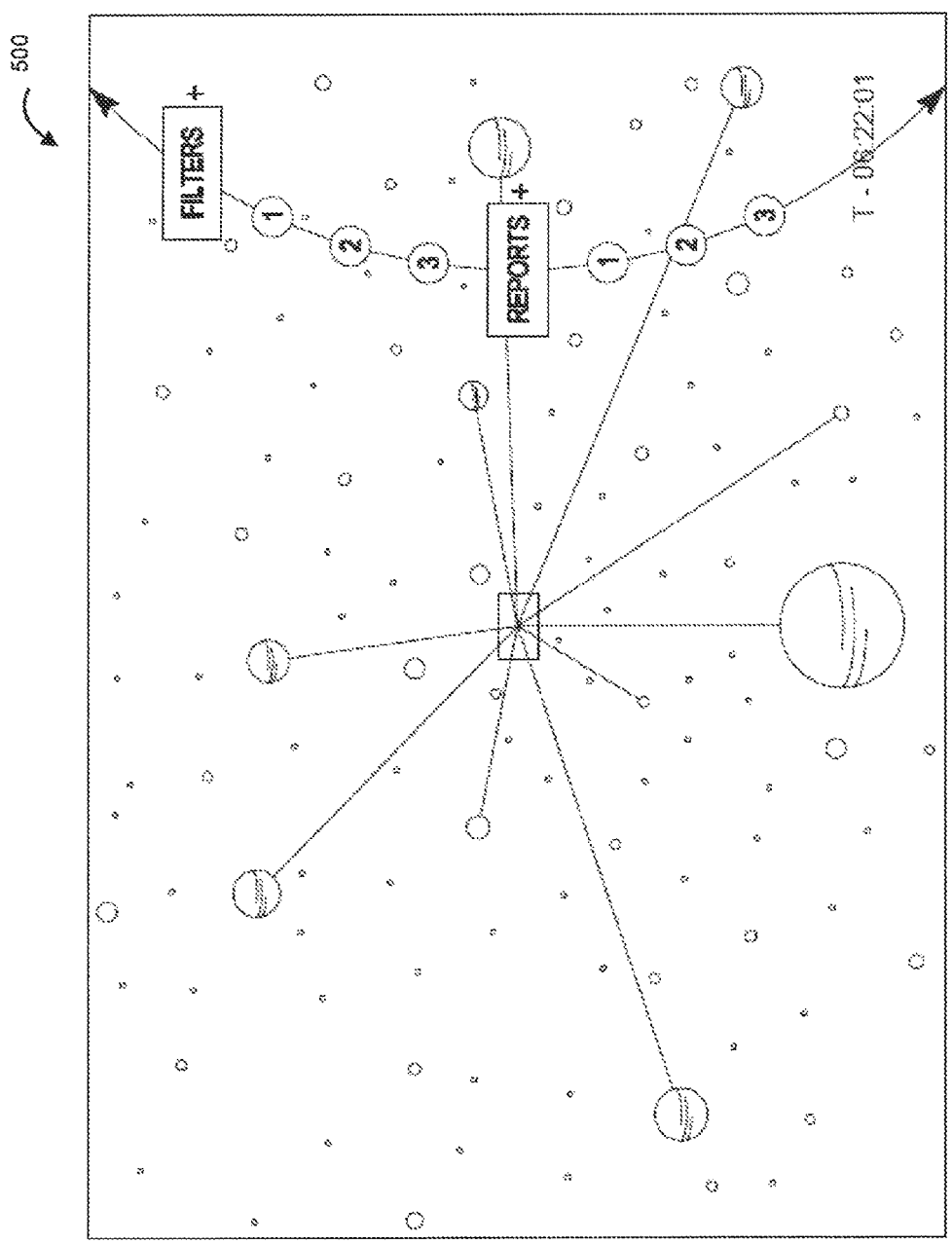

Using a predetermined gesture (e.g., a tap on the screen or a circular motion over the screen), or some other predetermined control command, a viewer may be able to select one of the stars in the star field, as shown in the UI screen 300 in FIG. 3. The selected star may be identified by the associated UI by, e.g., drawing a circle around it. A different gesture may be used to expand the selected star so it occupies a large portion of the display screen, as is shown in the UI screen 400 in FIG. 4. Within the star, the UI for visualization of transactional data objects may present details pertaining to the associated event. For example, the time code of when the event has occurred, the type of the event, customer ID associated with the event etc.

In addition to reviewing any individual event, the UI for visualization of transactional data objects may be configured to permit filtering of the events based on selected criteria. In response to a pre-determined gesture or some other predetermined control command, a filtering tool may be displayed on the viewer's display device. In one embodiment, a filtering tool may be a tool-circle displayed on one side of the screen, as shown in the UI screen 500 of FIG. 5. The filtering tool may be activated in response to a predetermined, control command. When a particular filter is selected and applied to the universe of events (to transactional data objects visualized as stars in a universe), the display of the universe is re-factored, such that the stars that match the filter criteria appear to shine brilliantly, while those that do not match the filter criteria recede into the background, as shown in the UI screen 600 of FIG. 6. The UI for visualization of transactional data objects may also display key statistics related to the filter results (not shown). A filter may be applied in real time, to even the newly created events. An example filter may permit an administrative user or analyst to view only those events that pertain to Product A or, e.g., only those events that pertain to Product A in Region R. In one embodiment, the UI for visualization of transactional data objects may be configured to allow an administrative user or analyst to create new ad-hoc filters that may be applied, in real-time, to the past events, as well as to the new events that are being created. Returning to FIG. 5, a tool-circle displayed on one side of the screen may include a reports tool that may be used, e.g., to determine elasticity curves of respective product lines.

Figure 6:
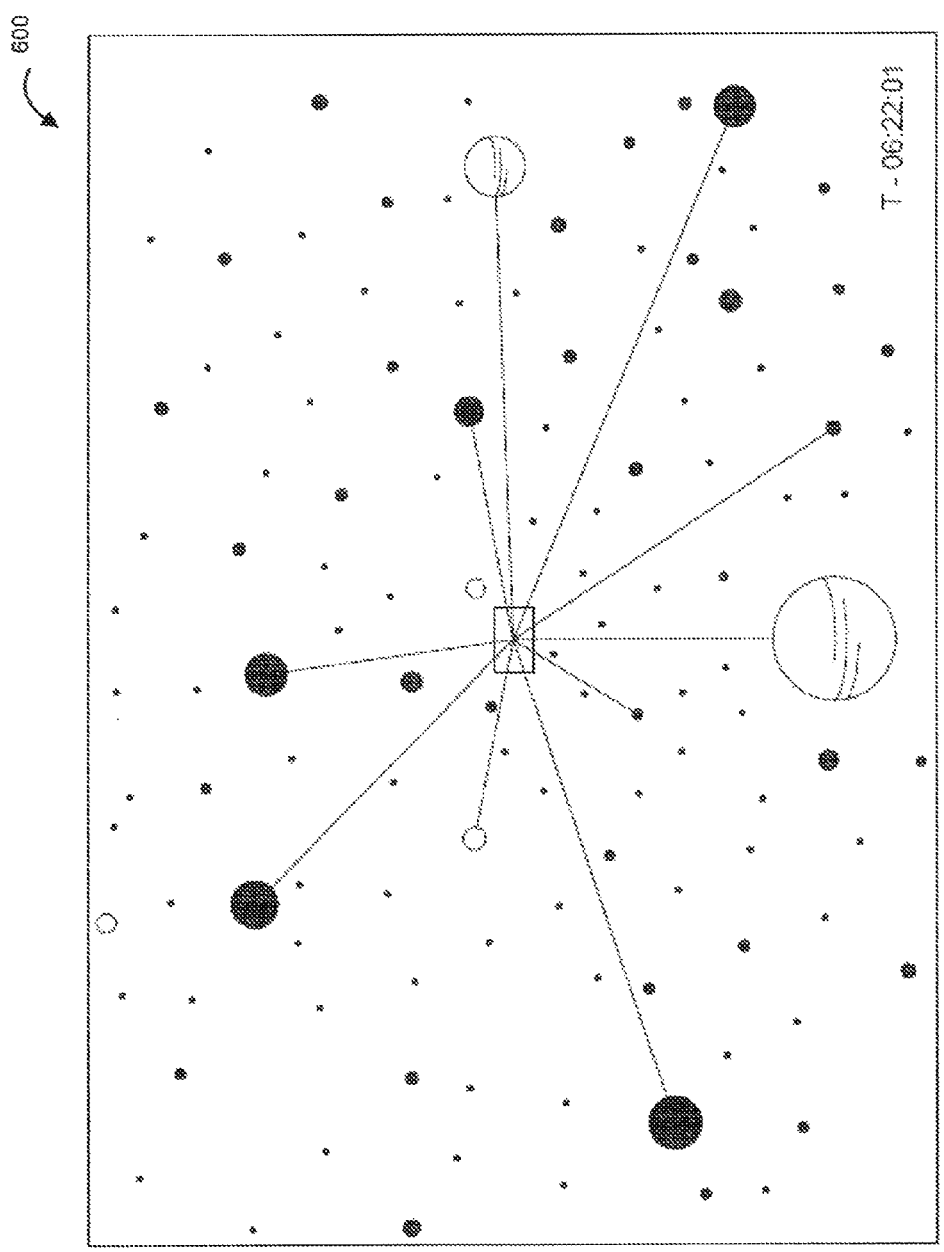

The UI for visualization of transactional data objects may also be configured to identify an event as a so-called trigger event if the event is associated with a customer that has a profile matching certain characteristics. When a trigger event is detected, the customer may be presented with a promotional offer (e.g., a virtual coupon) to purchase a product in real-time. A trigger event associated with a certain product may be selected and a recommendation generated by the system with respect the selected trigger event may be viewed and acted upon by the user. The UI screen 600 shown in FIG. 6 illustrates stars representing trigger events. These stars representing trigger events appear to be shining brightly while other stars appear as dim and receded into the background.

Figure 7:
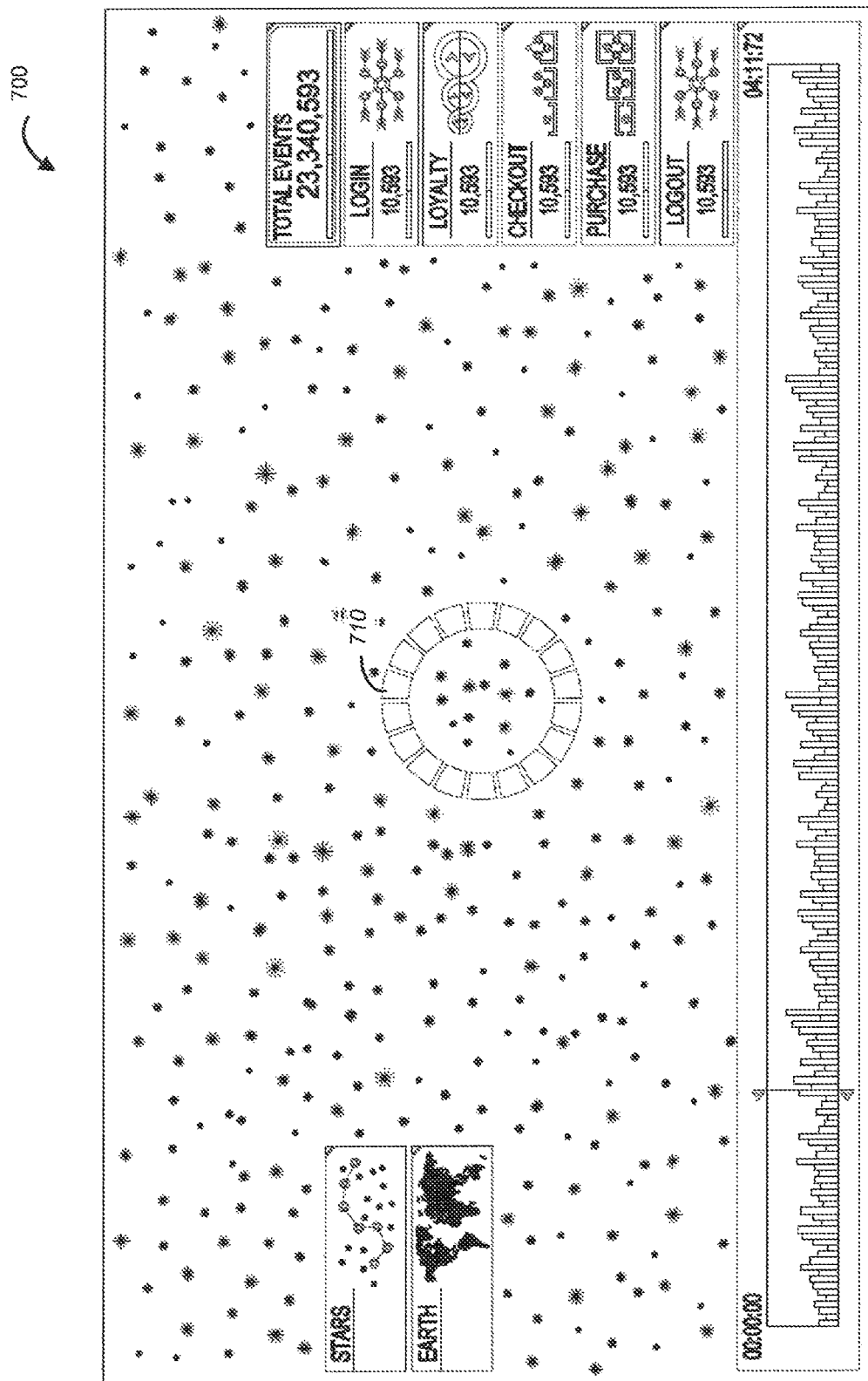
FIG. 7-13 are example screens that illustrate tittering and navigation through the three-dimensional space representing real time events in the form of transactional data objects, in accordance with one example embodiment.
Figure 8:
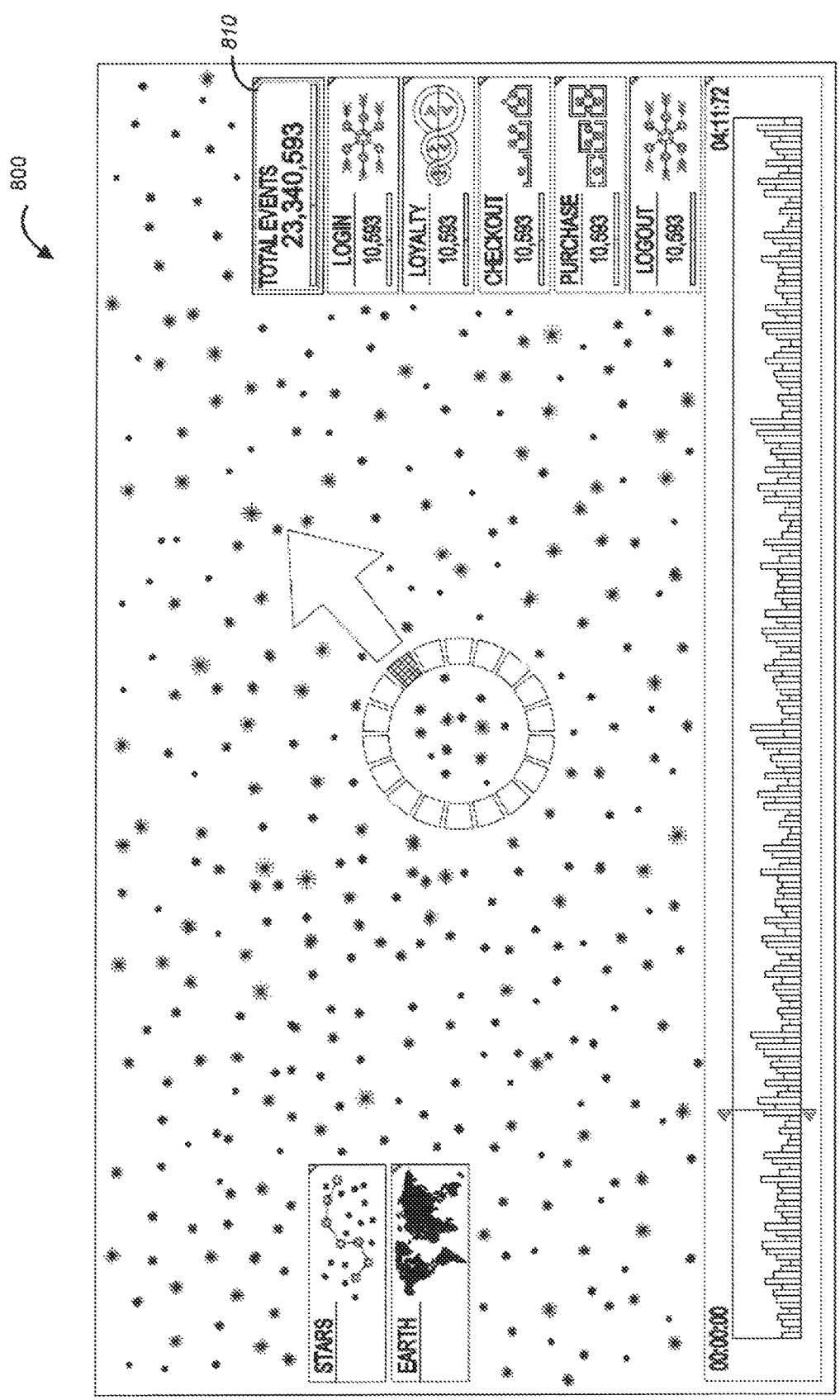
Figure 9:
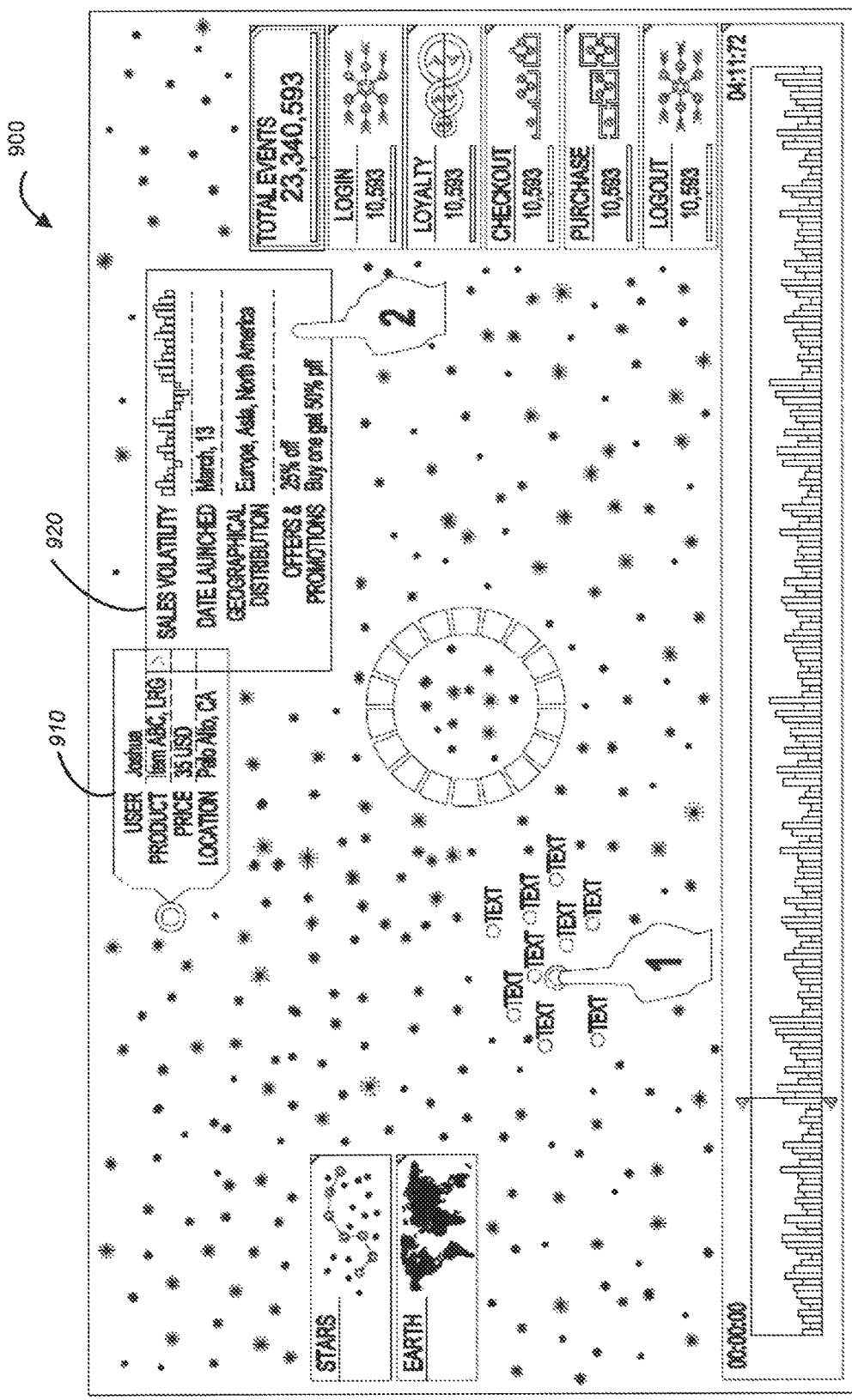

Further examples of filtering and navigation through the three-dimensional space representing real time events in the form of transactional data objects are shown in FIG. 7-13. The UI screen 700 shown in FIG. 7 illustrates an example of a focus point 710 that can be moved around the display area and also to permit examination of transactional data objects that represent respective events that occurred earlier in time. The UI screen 800 shown in FIG. 8 includes a panel 810 that lists different types of events represented by transactional data objects. The examples shown in the panel 810 include five example categories:
1. Login
2. Loyalty-based upgrade/downgrade
3. At-checkout purchase
4. Purchase
5. Logout The UI screen 900 shown in FIG. 9 illustrates event details that may be presented to an administrative user or analyst. Here, in area 910 an administrative user or analyst is presented with details of a purchase event, such as the name of the end-user who bought the product the identification of the product, the price paid for the produce, and the location at which the purchase occurred. On the product dashboard 920, the system for visualization of transactional data objects in real time displays analytics on the product, such as sales volatility for the past one year, the date the product was launched, geographical distribution for purchases, as well as offers and promotions for the product.

Figure 10:
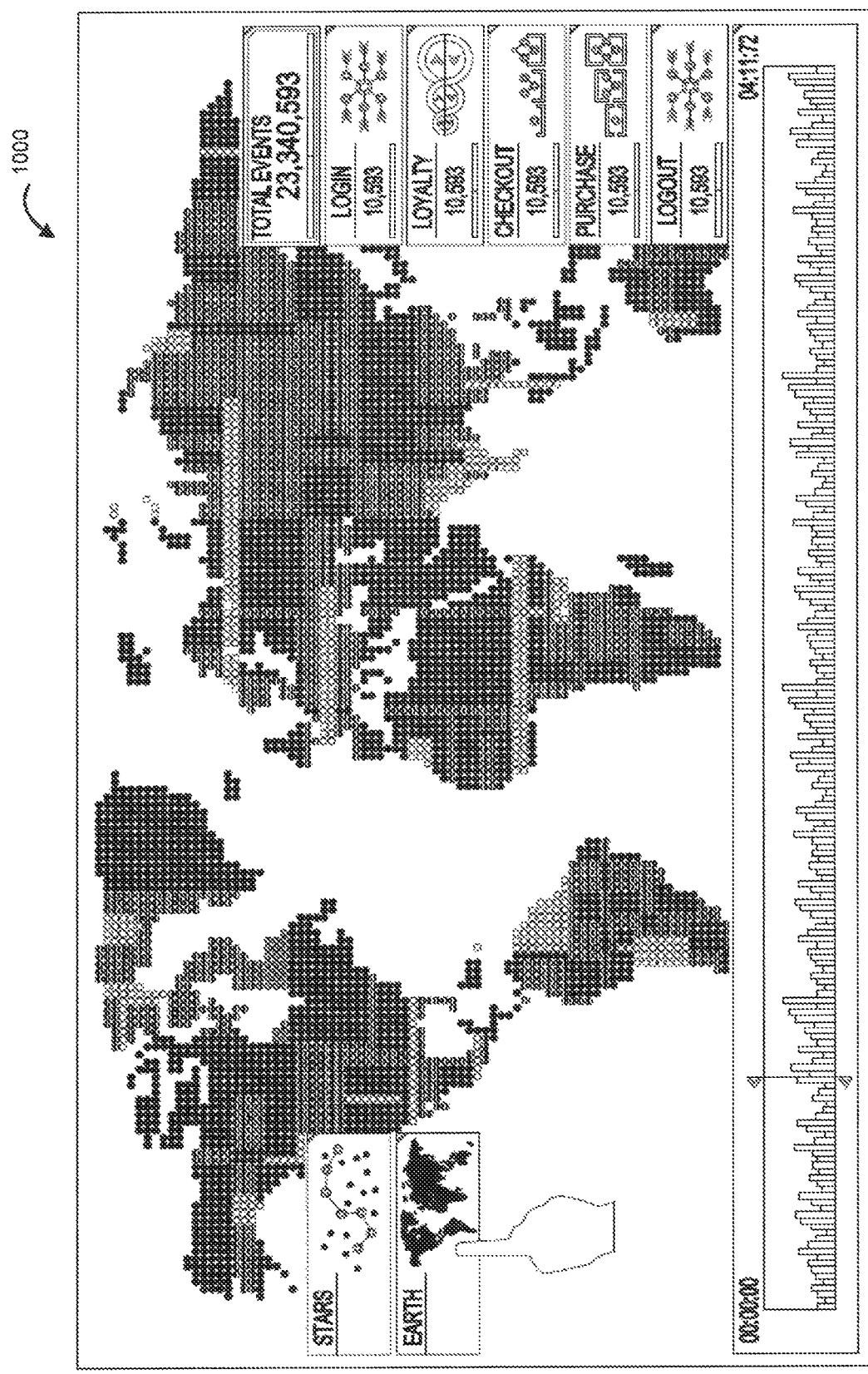

The UI screen 1000 shown in FIG. 10, also referred to as a heat map-illustrates a map view that shows distribution of events across geographical regions according to locations where respective events originated. As explained above, a heat map is a graphical representation of data, where transactional data objects characterized by certain attributes are represented by a respective color or shade. For example, where each of the transactional data objects include an attribute associated with a geographical location and another attribute that is associated with a dollar value, a heat map may be generated illustrating correlation between respective geographic locations of end-users and the dollar values generated by the respective end-users. The heat map may display concentrations of end-users who spend more money on purchases with a darker color or shade, and display concentrations of end-users who spend less money on purchases with a lighter color or shade.

Figure 11:
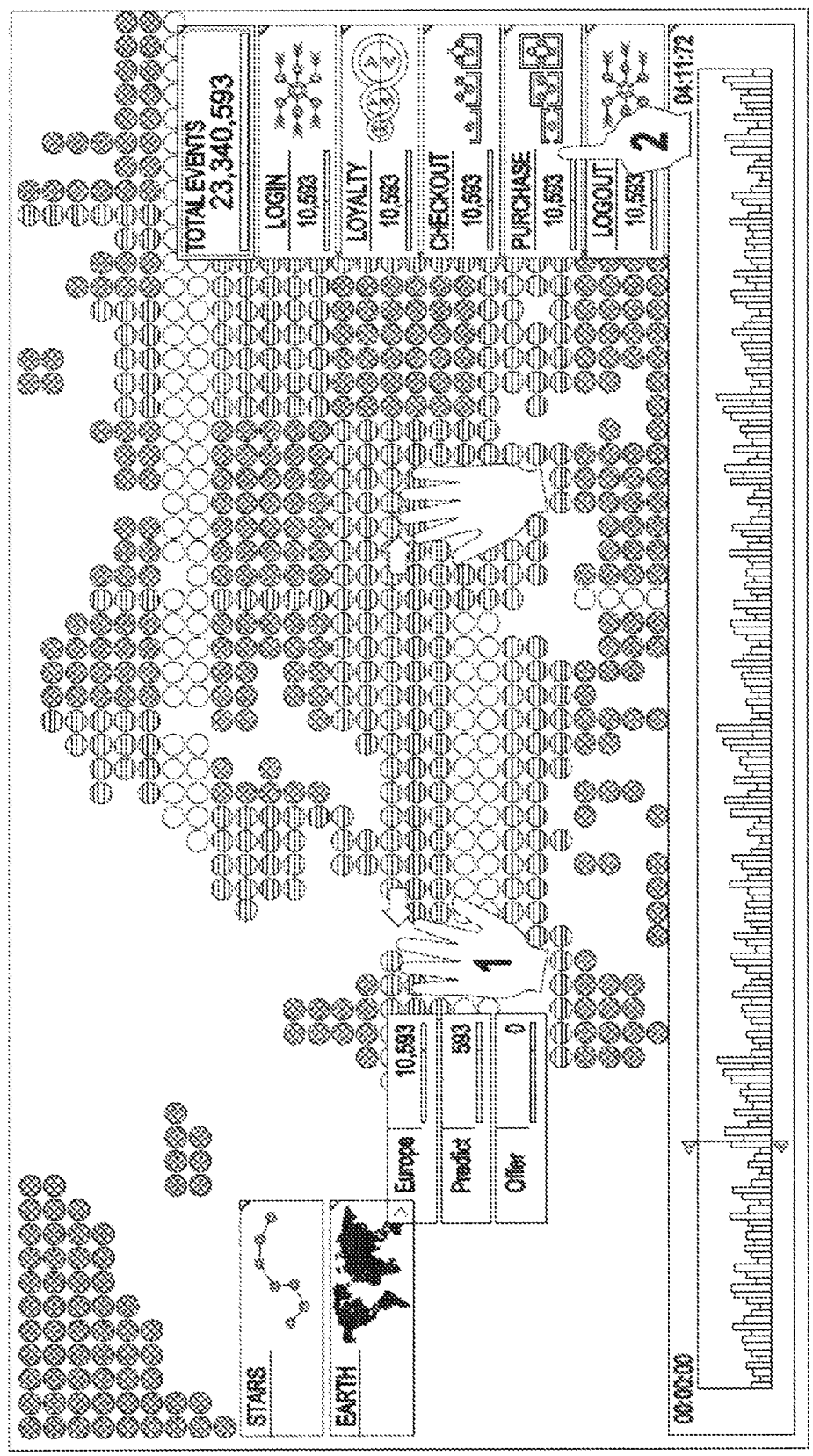

The UI screen 1100 shown in FIG. 11 illustrates zooming in on a particular area of the heat map. For example, if an administrative user or analyst notices high density of events shown in Germany on the map view, the administrative user or analyst may invoke a pre-determined gesture to zoom-in on that geographic location, as, e.g., is illustrated by the hands and outward-pointing arrows in FIG. 11. The stylized hand with a pointed finger that is marked with "1" in FIG. 11 illustrates that the system for visualization of transactional data objects in real time may also permit an administrative user or analyst to only view events related to certain criteria, such as, e.g., to only view events related to purchases.

Figure 12:
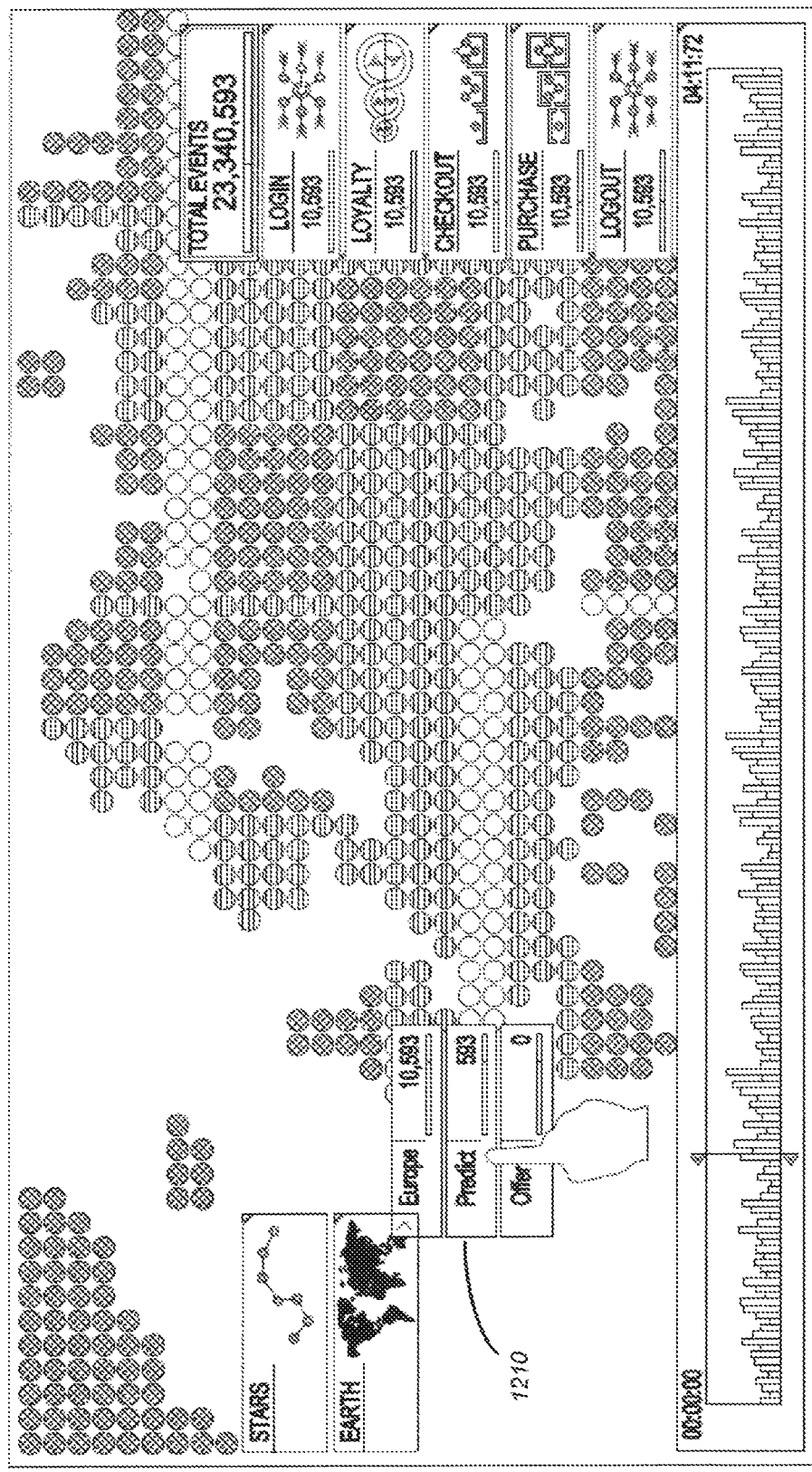
Figure 13:
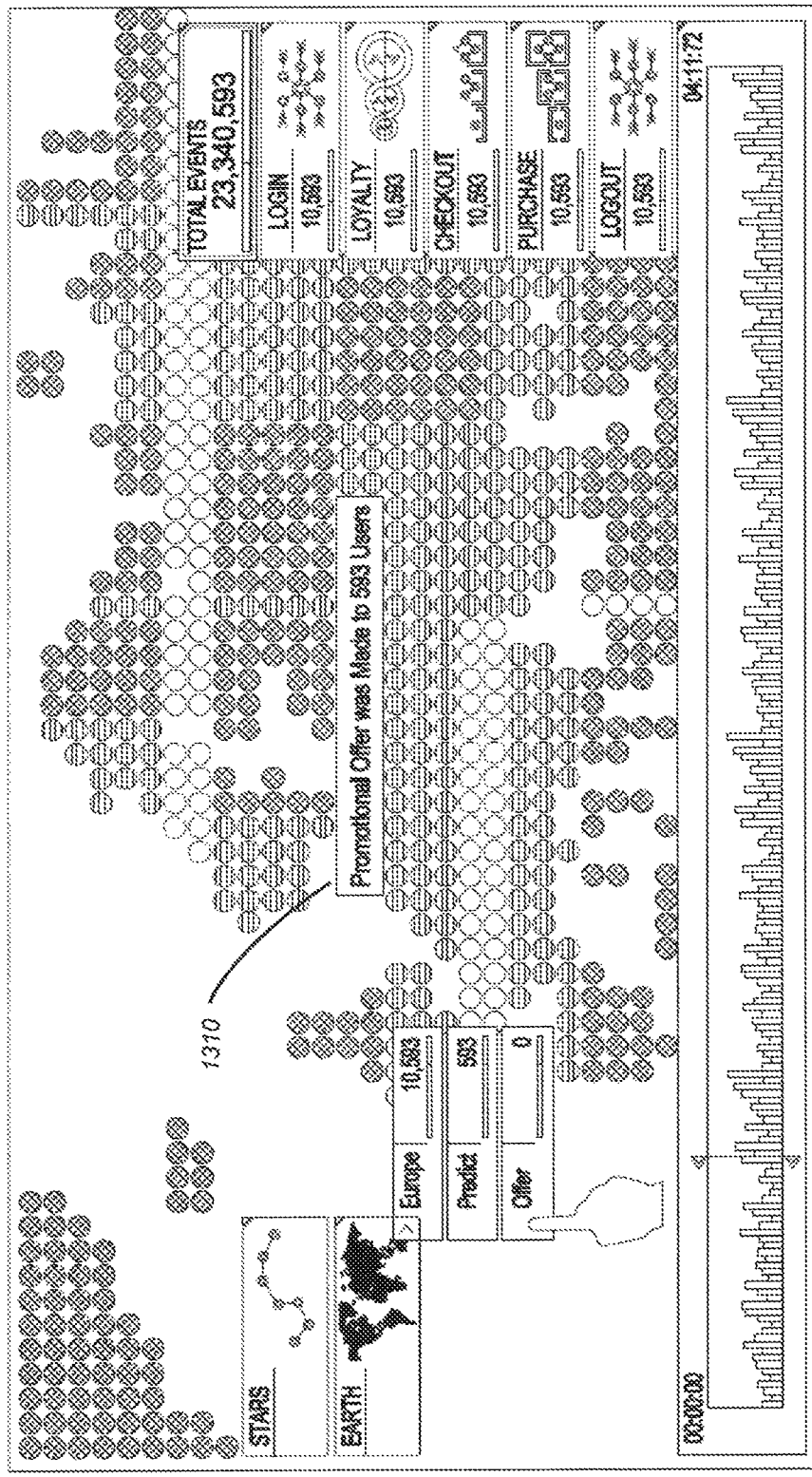

The UI screen 1200 shown in FIG. 12 illustrates a map view that shows, in area 1210, a prediction value. A prediction value may reflect, e.g., the number of events that are likely to generate a sale in the next minute. The UI screen 1300 shown in FIG. 13 illustrates a map view that shows that the administrative user or analyst may choose to make a promotional offer to those customers associated with predicted events, in order to increase probability of the occurrence of the respective sales. As shown in area 1310 of FIG. 13, the UI screen 1300 may provide the message to inform the administrative user or analyst that a promotional offer has been made to a certain number of customers. Thus, the UI to provide visualization of transactional data objects may be utilized to perform real-time analytics on a real-time event stream involving thousands of events per second. The events that may be originated anywhere in the world (at customer's home computers, as well as at points of sale in brick-and-mortar-stores) may be streamed directly into a database such as the database provided by HANA® in real-time.

Figure 14:
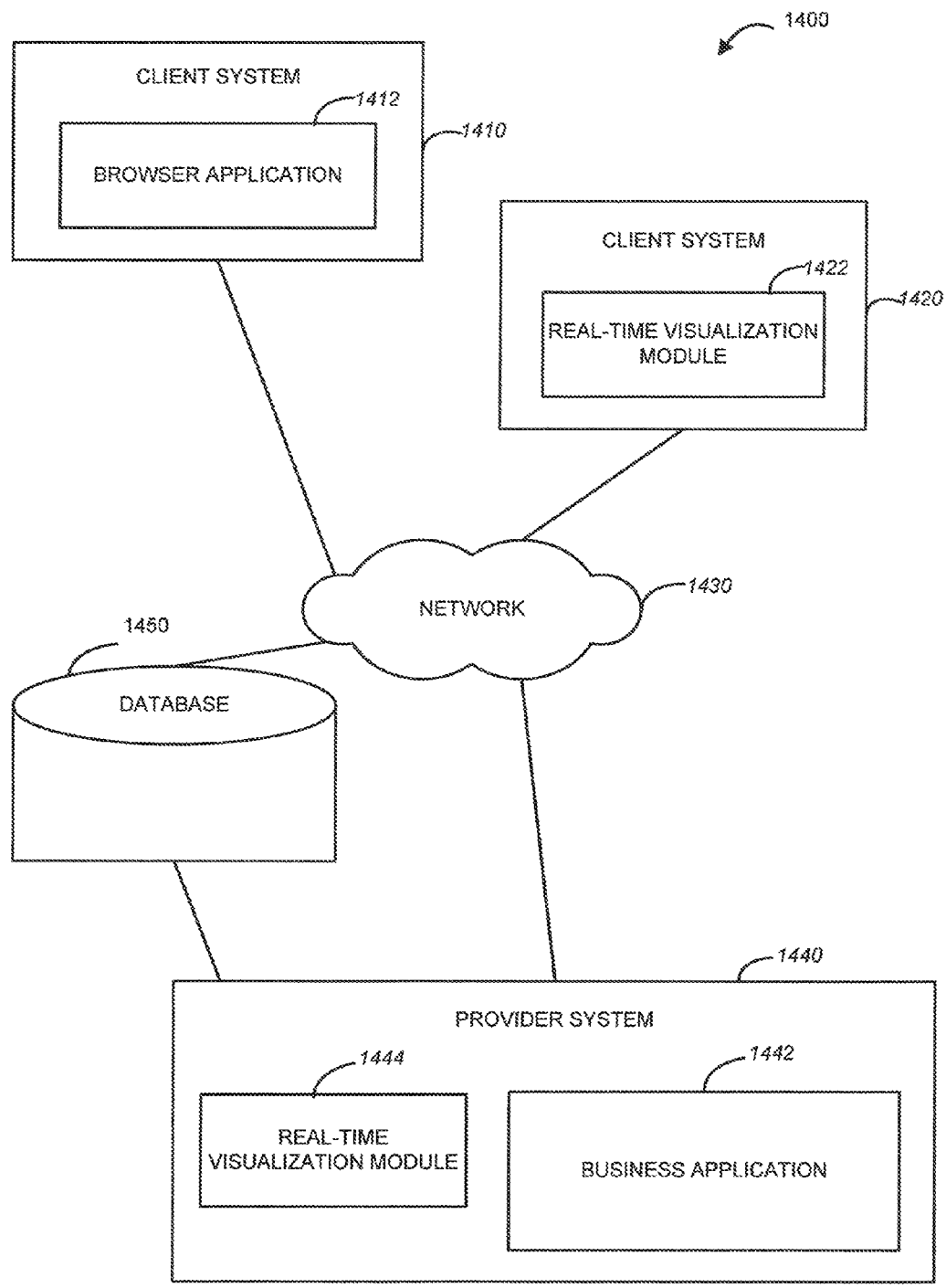
FIG. 14 is a diagrammatic representation of a network environment within which an example method and system for visualizing transactional data objects in real time may be implemented.

An example method and system for visualization of transactional data objects in real time may be implemented in the context of a network environment 1400 illustrated in FIG. 14. As shown in FIG. 14, the network environment 1400 may include client systems 1410 and 1420 and a provider system 1440. The provider system 1440, in one example embodiment, may host a real time visualization module 1444. The server system 1440, in one example embodiment, may also host a business application 1442, for example, SAP's HANA®.

The client system 1410 may utilize a browser application 1412 to access the real time visualization module 1444 via a browser application 112 executing on the client system 1410 via a communications network 1430. The communications network 1430 may be a public network (e.g., the Internet, a wifeless network, etc.) or a private network (e.g., a local area network (LAN), a wide area network (WAN), Intranet, etc.). In some embodiments, a real time visualization module may be executing locally with respect to a client system, such as, e.g., a real time visualization module 1422 executing on the client system 1420.

The real time visualization module 1444 may be configured to access a stream of transactional data objects representing real-time events and also to generate new transactional data objects. As mentioned above, transactional data objects representing real-time events may be stored in a database (such as, e.g., database 150) that resides in-memory and provides, simultaneously, transactional and analytical capabilities. The database 150 may be, e.g., a database provided with HANA® business application developed by SAP of Walldorf, Germany.

As mentioned above, a stream of transactional data objects representing real-time events may include, but is not limited to, representations of end-users' actions in an on-line web store, end-users' actions with respect to an on-line computer game, tweets, smart meters' readings, etc. In this generated visualization, the placement of a transactional data object from the stream of transactional data objects in a three-dimensional graphical paradigm within a display area may be determined based on one or more attributes of the transactional data object. For example, where transactional data objects are associated with end-users' actions with respect to a web store, objects that include a monetary value attribute may be presented closer to the center of the display area.

The real time visualization module 1444 may be further configured to detect one or more navigation instructions directed to the three-dimensional graphical paradigm and, based on the detected instructions, generate a new representation of the stream of transactional data objects. For example, when an administrative user or analyst clicks on or gestures at a particular part of the display area, the new representation of the stream of transactional data objects may be generated from a local point of one or more of the objects located in the clicked-on display area. The type of gesture used may vary from implementation to implementation. In another example, a navigation instruction may be processed by the real time visualization module 1444 to zoom into or zoom out from the view of the stream of transactional data objects.

Still further, the real time visualization module 1444 may be configured to detect a request to activate a filter and, responsive to the request, suppress rendering of transactional data objects representing events of a certain type, based on criteria associated with the filter. The criteria associated with the filter may be associated with a type of a transactional data object, with one or more values stored in a transactional data object, etc. The real time visualization module 1444 may be further configured to generate so-called heat maps, where the heat map representation of the transactional data objects illustrates a relationship between two respective attributes of the transactional data objects.

Figure 15:
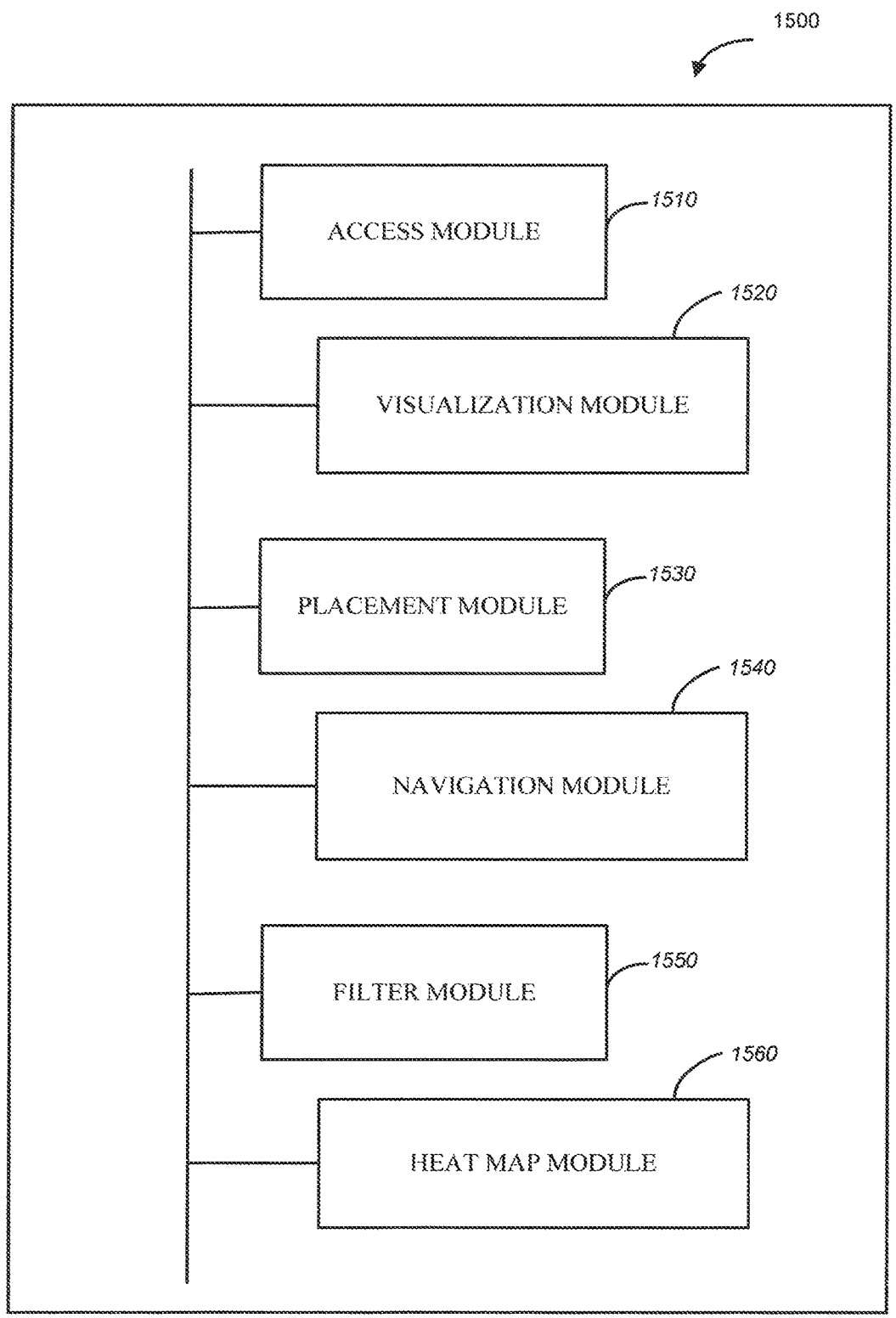
FIG. 15 is block diagram of a system for visualizing transactional data objects in real time, in accordance with one example embodiment.

FIG. 15 is a block diagram of a system 1500 for visualization of transactional data objects in real time, in accordance with one example embodiment. As shown in FIG. 15, the system 1500 includes an access module 1510, a visualization module 1520, a placement module 1530, a navigation module 1540, a filter module 1550, and a heat map module 1560. The modules of the system 1500 may perform operations utilizing one or more processors.

The access module 1510 may be configured to access a stream of transactional data objects. As explained above, objects may represent respective real-time events, while the stream of transactional data objects may be accessed from an in-memory data management platform, such as, e.g., HANA®. The visualization module 1520 may be configured to visualize transactional data objects from the accessed stream in a three-dimensional graphical paradigm. Examples of visualization can be seen in FIG. 1-13 described above.

The placement module 1530 may be configured to determine placement of transactional data objects from the stream in the three-dimensional graphical paradigm, based on respective one or more attributes of the transactional data object. As explained above, an attribute of a transactional data object may indicate a type of an associated event (e.g., viewing of a product or a purchase), the frequency of the occurrence of that type of event, the geographic location associated with the event, etc. The navigation module 1540 may be configured to detect navigation instructions directed to the three-dimensional graphical paradigm and based on the detected navigation instruction, generate a new representation of the stream of transactional data objects. For example, as illustrated in FIG. 1-13, a viewer may manipulate the presentation of the transactional data objects from the stream by engaging, e.g., gestures and visual controls that may be provided on the screen. A new representation of the stream of transactional data objects may be associated with, e.g., a new focal point with respect to the three-dimensional graphical paradigm, where the new focal point is determined based on the one or more navigational instructions. The filter module 1550 may be configured to detect, a request to activate a filter and, responsive to the request, suppress rendering of transactional data objects representing events of a certain type, based on criteria associated with the filter. The criteria associated with the filter may be a type of a transactional data object or, e.g., one or more values stored in a transactional data object. For example, the filter module 1550 may be engaged to permit an administrative user or analyst to view only those transactional data objects that represent events that pertain to a specific product or, e.g., only those transactional data objects that represent events that pertain to a specific product, in a certain geographical area.

The heat map module 1560 may be configured to generate a heat map representation of the transactional data objects. A heat map representation may illustrate relationship between respective attributes of transactional data objects. For example, where the selected attributes of transactional data objects are associated with a geographical location and a monetary value respectively, a heat map may indicate concentration of end-users who spend more money on purchases with a darker color or shade and those who spend less money on purchases with a lighter color or shade, such that the correlation between the geographic location of a end-user and the dollar amount generated by the respective end-users may become visually apparent. An example heat map is shown in FIG. 10 referenced above. The system 1500 may include other modules as well, such as, e.g., a reports module (not shown) that may be used, e.g., to determine elasticity curves of respective product lines. An example method for visualization of transactional data objects in real time can be described with reference to FIG. 16.

Figure 16:
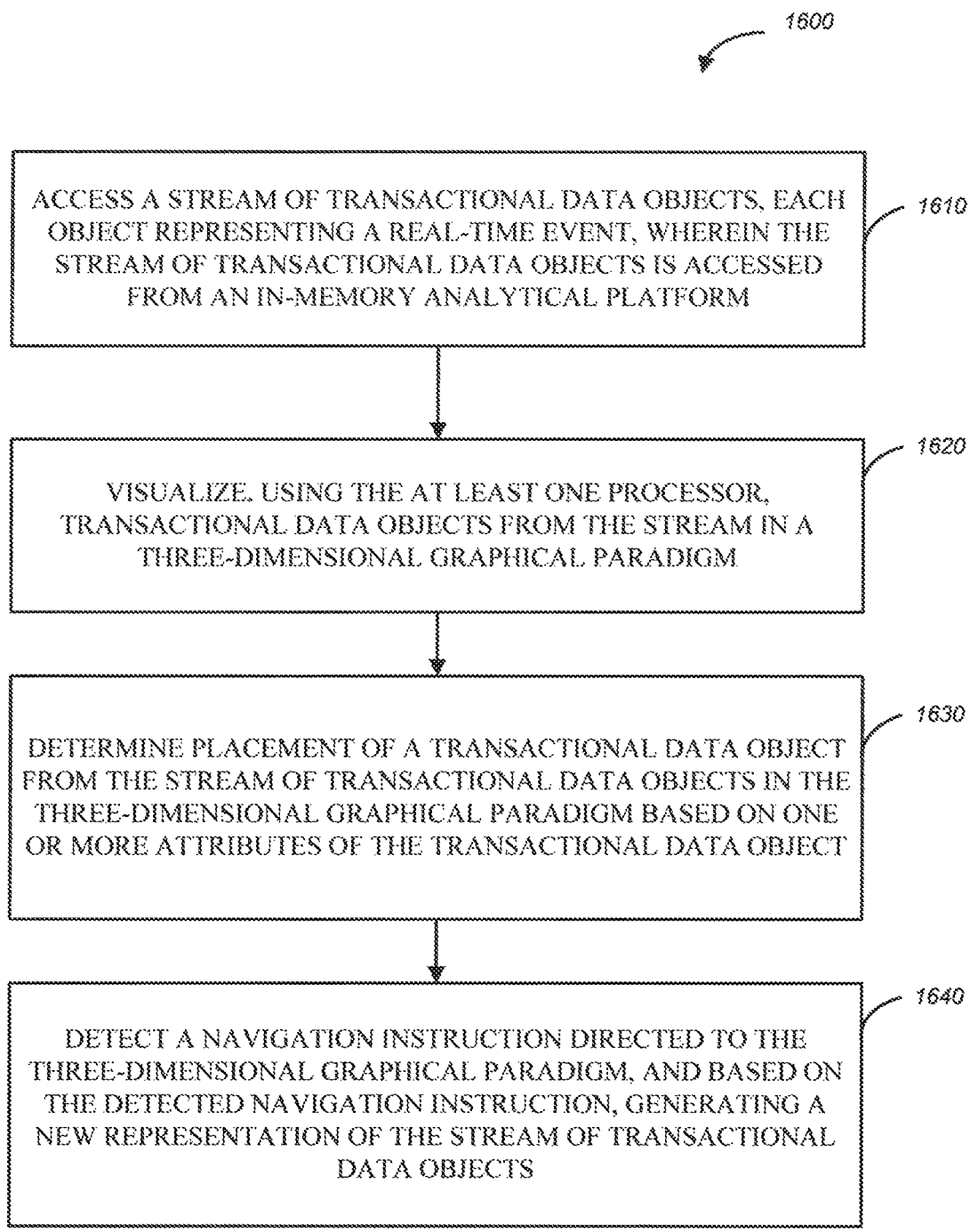
FIG. 16 is a flow chart of a method for visualizing transactional data objects in real time, in accordance with an example embodiment.

FIG. 16 is a flow chart of a method 1600 for visualization of transactional data objects in real time, according to one example embodiment. The method 1600 may be performed by processing logic that may comprise hardware (e.g., dedicated logic, programmable logic, microcode, etc.), software (such as run on a general purpose computer system, or a dedicated machine), or a combination of both. In one example embodiment, the processing logic resides at the provider system 1440 of FIG. 14 and, specifically, at the system 1500 shown in FIG. 15.

As shown in FIG. 16, the method 1600 commences at operation 1610, where the access module 1510 of FIG. 15 accesses a stream of transactional data objects. As explained above, objects may represent respective real-time events, while the stream of transactional data objects may be accessed from an in-memory data management platform, such as, e.g., HANA®. At operation 1620, the visualization module 1520 of FIG. 15 visualizes transactional data objects from the accessed stream in a three-dimensional graphical paradigm as, e.g., shown in FIG. 1-13 described above. At operation 1630, the placement module 1530 of FIG. 15 determines placement of transactional data objects from the stream in the three-dimensional graphical paradigm based on respective one or more attributes of the transactional data object. At operation 1640, the navigation module 1540 of FIG. 15 detects navigation instructions directed to the three-dimensional graphical paradigm and, based on the detected navigation instruction, generates a new representation of the stream of transactional data objects. As mentioned above, a viewer may manipulate the presentation of the transactional data objects from the stream by engaging, e.g., gestures and visual controls that may be provided on the screen.

Figure 17:
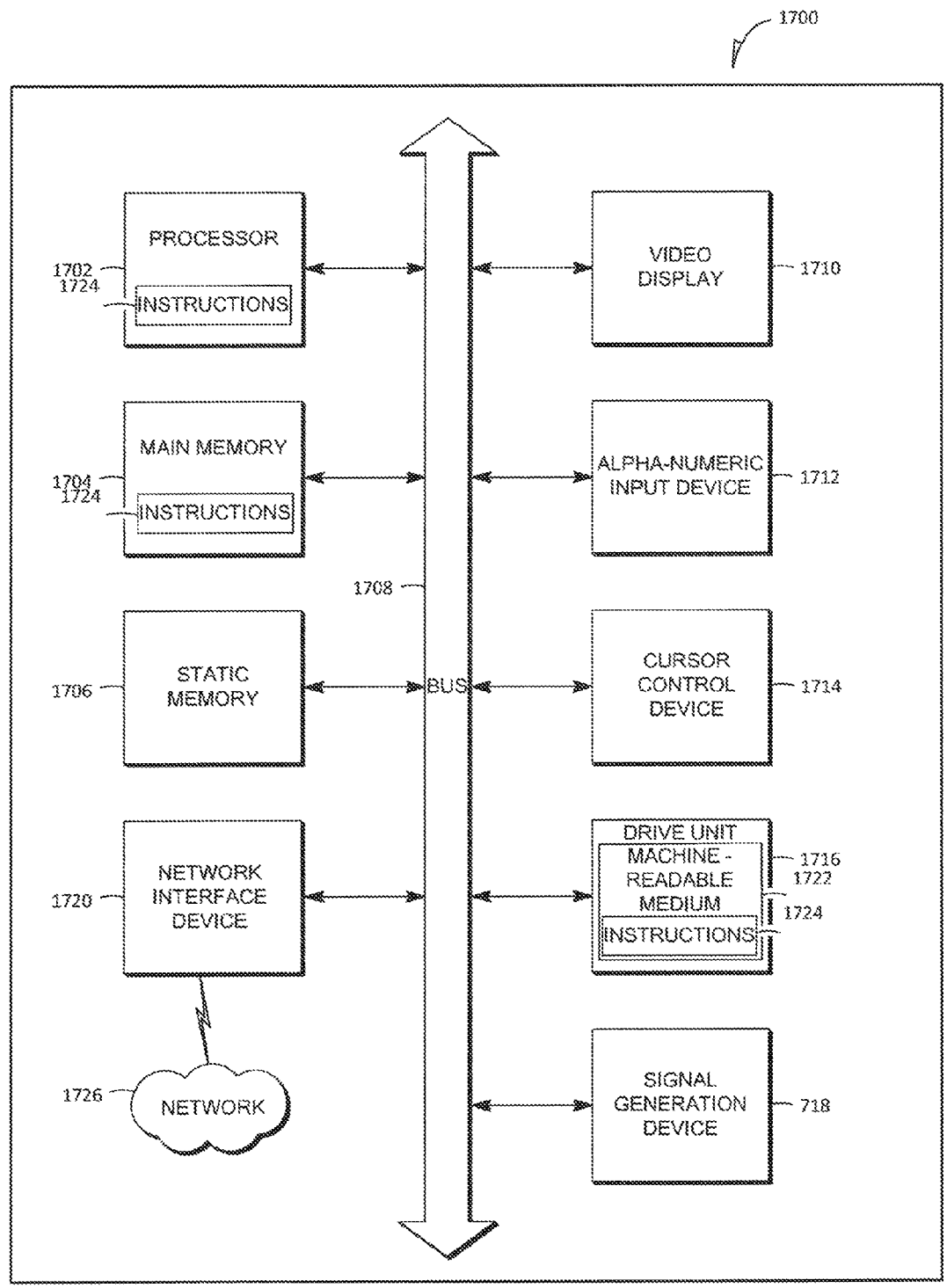
FIG. 17 is a diagrammatic representation of an example machine in the form of a computer system within which a set of instructions, for causing the machine to perform any one or more of the methodologies discussed herein, may be executed.

FIG. 17 shows a diagrammatic representation of a machine in the example form of a computer system 1700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP16 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 700 may further include a video display unit 1770 (e.g., a liquid crystal display (LCD) or a cathode ray tube (CRT)). The computer system 1700 also includes an alphanumeric input device 1772 (e.g., a keyboard), a user interface (UI) navigation device 1774 (e.g., a mouse), a disk drive unit 1776, a signal generation device 1778 (e.g., a speaker) and a network interlace device 1720.

The disk drive unit 1776 includes a machine-readable medium 1722 on which is stored one or more sets of instructions and data structures (e.g., software 1724) embodying or utilized by any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720 utilizing any one of a number of well-known transfer protocols (e.g., HTTP).

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that, is capable of storing, encoding or carrying data structures utilized by or associated with such a set of instructions. The term "machine-readable medium" shall accordingly be taken to include, but not be limited to, solid-state memories, optical and magnetic media, and earner wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been, described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
    accessing a database that resides in-memory and provides, simultaneously, transactional and analytical capabilities by embedding application logic into the database itself, the database storing and processing transactional data representing respective real-time events;
    accessing a real-time stream of transactional data objects logged into the database, each object from the stream of transactional data objects representing a particular real-time event;
    generating, using at least one processor coupled to a memory, a visualization of transactional data objects from the stream in a three-dimensional graphical paradigm, respective depth spacing between the visualized transactional data objects being proportional to respective amounts of time elapsed between events represented by the respective visualized transactional objects;
    detecting one or more navigation instructions directed to the three-dimensional graphical paradigm; and
    based on the one or more navigation instructions, generating a new representation of the stream of transactional data objects associated with a new focal point with respect to the three-dimensional graphical paradigm, the new focal point determined based on the one or more navigational instructions.

2. The method of claim 1, comprising determining placement of a transactional data object from the stream of transactional data objects in the three-dimensional graphical paradigm based on one or more attributes of the transactional data object.

3. The method of claim 1, wherein the one or more navigation instructions are associated with one or more gestures.

4. The method of claim 1, comprising:
    detecting a request to activate a filter; and responsive to the request suppressing rendering of transactional data objects representing events of a certain type, based on criteria associated with the filter.

5. The method of claim 4, wherein the criteria associated with, the filter is a type of a transactional data object or one or more values stored in a transactional data object.

6. The method of claim 1, comprising;
based on a first and a second attributes of the transactional data objects, generating a heat map representation of the transactional data objects, the heat map representation illustrating relationship between the first attribute and the second attribute with respect to the transactional data objects.

7. The method of claim 6, comprising representing the relationship between the first attribute and the second attribute using color representation of respective transactional data objects.

8. The method of claim 6, wherein the first attribute is associated with a geographical location and the second attribute Is associated with a monetary value.

9. A system comprising:
an access module, implemented using at least one processor, to:
access a database that resides in-memory and provides, simultaneously, transactional and analytical capabilities by embedding application logic into the database itself, the database storing and processing transactional data representing respective real-time events;
access a real-time stream of transactional data objects logged into the database, each object from the stream of transactional data objects representing a particular real-time event;
a visualization module, implemented using at least one processor, to visualize, using the at least one processor, transactional data objects from the stream in a three-dimensional graphical paradigm, respective depth spacing between the visualized transactional data objects being proportional to respective amounts of time elapsed between events represented by the respective visualized transactional objects; and
a navigation module configured to:
detect, using the at least one processor, one or more navigation instructions directed to the three-dimensional graphical paradigm, and
based on the one or more navigation instructions, generate, using the at least one processor, a new representation of the stream of transactional data objects associated with a new focal point with respect to the three-dimensional graphical paradigm, the new focal point determined based on the one or more navigational instructions.

10. The system of claim 9, comprising a placement module to determine, using the at least one processor, placement of a transactional data object from the stream of transactional data objects in the three-dimensional graphical paradigm based on one or more attributes of the transactional data object.

11. The system of claim 9, wherein the one or more navigation instructions are associated with one or more gestures.

12. The system of claim 9, comprising a filter module to:
detect, using the at least one processor, a request to activate a filter; and
responsive to the request, suppress, using the at least one processor, rendering of transactional data objects representing events of a certain type, based on criteria associated with the filter.

13. The system of claim 12, wherein the criteria associated with the filter is a type of a transactional data object or one or more values stored in a transactional data object.

14. The system of claim 9, comprising a heat map module to:
based on a first and a second attributes of the transactional data objects, generate, using the at least one processor, a heat map representation of the transactional data objects, the heat map representation illustrating relationship between the first attribute and the second attribute with respect to the transactional data objects.

15. The system of claim 14, wherein the first attribute is associated with a geographical location and the second attribute is associated with a monetary value.

16. A machine-readable non-transitory storage medium having instruction data to cause a machine to perform operations comprising:
accessing a database that resides in-memory and provides, simultaneously, transactional and analytical capabilities by embedding application logic into the database itself, the database storing and processing transactional data representing respective real-time events;
accessing a real-time stream of transactional data objects logged into the database, each object from the stream of transactional data objects representing a particular real-time event;
visualizing transactional data objects from the stream in a three-dimensional graphical paradigm, respective depth spacing between the visualized transactional data objects being proportional to respective amounts of time elapsed between events represented by the respective visualized transactional objects;
detecting one or more navigation instructions directed to the three-dimensional graphical paradigm; and
based on the one or more navigation instructions, generating a new representation of the stream of transactional data objects associated with a new focal point with respect to the three-dimensional graphical paradigm, the new focal point determined based on the one or more navigational instructions.

17. A method comprising:
accessing a database that resides in-memory and provides, simultaneously, transactional and analytical capabilities by embedding application logic into the database itself, the database storing and processing transactional data representing respective real-time events;
accessing a real-time stream of transactional data objects logged into the database, each object from the stream of transactional data objects representing a particular real-time event;
generating, using at least one processor coupled to a memory, a visualization of transactional data objects from the stream in a three-dimensional graphical paradigm, respective depth spacing between the visualized transactional data objects being proportional to respective amounts of time elapsed between events represented by the respective visualized transactional objects; and
based on a first and a second attributes of the transactional data objects, generating a heat map representation of the transactional data objects, the heat map representation illustrating relationship between the first attribute and the second attribute with respect to the transactional data objects.

18. The method of claim 17, comprising representing the relationship between the first attribute and the second attribute using color representation of respective transactional data objects.

19. The method of claim 17, wherein the first attribute is associated with a geographical location and the second attribute is associated with a monetary value.

20. A system comprising:
an access module, implemented using at least one processor, to:
access a database that resides in-memory and provides, simultaneously, transactional and analytical capabilities by embedding application logic into the database itself, the database storing and processing transactional data representing respective real-time events;
access a real-time stream of transactional data objects logged into the database, each object from the stream of transactional data objects representing a particular real-time event;
a visualization module, implemented using at least one processor, to visualize, using the at least one processor, transactional data objects from the stream in a three-dimensional graphical paradigm, respective depth spacing between the visualized transactional data objects being proportional to respective amounts of time elapsed between events represented by the respective visualized transactional objects; and
a heat map module to:
based on a first and a second attributes of the transactional data objects, generate, using the at least one processor, a heat map representation of the transactional data objects, the heat map representation illustrating relationship between the first attribute and the second attribute with respect to the transactional data objects.

21. The system of claim 20, wherein the first attribute is associated with a geographical location and the second attribute is associated with a monetary value.

22. A machine-readable non-transitory storage medium having instruction data to cause a machine to perform operations comprising:
accessing a database that resides in-memory and provides, simultaneously, transactional and analytical capabilities by embedding application logic into the database itself, the database storing and processing transactional data representing respective real-time events;
accessing a real-time stream of transactional data objects logged into the database, each object from the stream of transactional data objects representing a particular real-time event;
generating, using at least one processor coupled to a memory, a visualization of transactional data objects from the stream in a three-dimensional graphical paradigm, respective depth spacing between the visualized transactional data objects being proportional to respective amounts of time elapsed between events represented by the respective visualized transactional objects; and
based on a first and a second attributes of the transactional data objects, generating a heat map representation of the transactional data objects, the heat map representation illustrating relationship between the first attribute and the second attribute with respect to the transactional data objects.

* * * * *